US012691453B2

(12) United States Patent (10) Patent No.: US 12,691,453 B2
Gibson (45) Date of Patent: Jul. 28, 2026

(54) LOCKING ROTOR ROTATION DEVICE

(71) Applicant: Terex GB Limited, Dungannon (GB)

(72) Inventor: David Gibson, Dromore (GB)

(73) Assignee: Terex GB Limited, Dungannon (GB)

( * ) Notice: Subject to any disclaimer, the term of this patent is extended or adjusted under 35 U.S.C. 154(b) by 778 days.

(21) Appl. No.: 18/102,372

(22) Filed: Jan. 27, 2023

(65) Prior Publication Data

US 2023/0241618 A1     Aug. 3, 2023

(30) Foreign Application Priority Data

Jan. 31, 2022     (GB) ..................................... 2201246

(51) Int. Cl.
  B02C 13/30       (2006.01)
  F16H 1/16        (2006.01)
  F16H 19/08       (2006.01)
(52) U.S. Cl.
  CPC .............. B02C 13/30 (2013.01); F16H 1/16 (2013.01); F16H 19/08 (2013.01)
(58) Field of Classification Search
  CPC . F16H 1/16; F16H 19/08; F16H 1/166; F16H 55/22; F16H 2035/005; F16H 57/039; B66C 23/84; B02C 7/16; B02C 17/24; B02C 4/42; B02C 18/38; B02C 18/24; B02C 19/0018; B02C 21/02; B02C 13/31
  See application file for complete search history.

(56) References Cited

U.S. PATENT DOCUMENTS

| | | | | |
|---|---|---|---|---|
| 2,531,158 | A | 11/1950 | Robinson | |
| 2,666,335 | A * | 1/1954 | Clayborne | ................ F16H 1/16 |
| | | | | 74/411 |
| 2,752,009 | A * | 6/1956 | MacDougall | .......... F16D 65/60 |
| | | | | 188/196 R |
| 3,465,603 | A * | 9/1969 | Lindstrom | .............. F16D 65/50 |
| | | | | 74/89.14 |
| 3,543,944 | A * | 12/1970 | Uren | ........................ B66C 23/54 |
| | | | | 212/238 |
| 6,305,236 | B1 * | 10/2001 | Sturdevant | .............. B25B 21/00 |
| | | | | 74/421 A |
| 9,353,781 | B2 * | 5/2016 | Morgan | ................ F16B 7/0493 |
| 9,766,319 | B2 * | 9/2017 | Au | ........................... H02S 20/32 |
| 2015/0082923 | A1 * | 3/2015 | Morgan | .................... F16H 1/16 |
| | | | | 74/89.14 |
| 2019/0112874 | A1 | 4/2019 | Hsieh | |

FOREIGN PATENT DOCUMENTS

| | | |
|---|---|---|
| CN | 202343252 | 7/2012 |
| CN | 206746698 | 12/2017 |
| CN | 208804189 | 4/2019 |
| EP | 2 123 831 | 11/2009 |
| JP | 2010-096313 | 4/2010 |
| WO | 2015/080686 | 6/2015 |

* cited by examiner

*Primary Examiner* — Thomas C Diaz
(74) *Attorney, Agent, or Firm* — Warner Norcross + Judd LLP

(57)     ABSTRACT

A rotor rotation device the rotor of a crusher includes a drive mechanism comprising a worm shaft and corresponding worm wheel. The worm wheel can selectively be coupled to said rotor in order to effect controlled rotation of the rotor, e.g. to facilitate maintenance of the crusher. The worm shaft cannot be back-driven by the rotor which allows the drive mechanism to serve as a lock against unwanted or uncontrolled rotation of the rotor.

20 Claims, 8 Drawing Sheets

LOCKING ROTOR ROTATION DEVICE

FIELD OF THE INVENTION

The present invention relates to rotor rotating devices. The invention relates especially, but not exclusively, to rotor rotating devices for material processing devices that comprise a rotor, for example impact crushers.

BACKGROUND TO THE INVENTION

Some material processing devices include a rotor to which an operator may be exposed, particularly during maintenance, thereby risking injury or death. For example, an impact crusher includes a crushing rotor located in a crushing chamber. In use, rotation of the rotor causes material, e.g. rocks, within the chamber to be crushed against crushing surfaces within the chamber until they are small enough to fit through a gap beside the rotor. Traditionally, if the crusher jams the operator has to access the crushing chamber to clear the jam. Should the rotor rotate when the crusher is open, rocks may be flung from the crusher causing injury, or the operator may become trapped by the rotor. In some instances, it is necessary for the operator to manually rotate the drum in order to free a blockage or for other maintenance purposes, e.g. replacing a wearable component such as a blade or wear plate, which may also expose the operator to danger if the crusher is open. For example, operators have been known to stand on the rotor to try to rotate it with their weight and this may result in injury or death.

It would be desirable therefore to provide an apparatus in which unwanted rotation of the rotor is prevented while still allowing purposeful rotation.

SUMMARY OF THE INVENTION

From a first aspect, the invention provides a rotor rotation device for controlling rotation of a rotor of a material processing device, the rotor rotation device comprising: a drive mechanism; and means for selectively coupling the drive mechanism to the rotor, wherein said rotor rotation device is operable in a driving state in which said coupling means couples the drive mechanism to the rotor to allow rotation of said rotor by said drive mechanism, or in a non-driving state in which said coupling means does not couple the drive mechanism to the rotor, and wherein said drive mechanism comprises a worm shaft and corresponding worm wheel, said coupling means being configurable to selectively couple said worm wheel to said rotor. Typically said worm shaft comprises at least one worm, preferably only one worm.

In preferred embodiments, said drive mechanism comprises a slewing drive mechanism comprising said worm shaft and corresponding worm wheel in the preferred form of a slewing ring.

Said slewing drive mechanism typically comprises a hub, typically an annular hub, on which said slewing ring is rotatably supported, typically by one or more bearings.

Typically, said slewing ring provides an interface by which said rotor may be selectively coupled to the drive mechanism, wherein said interface may comprise a side of the slewing ring, or an annular plate coupled to a side of the slewing ring.

In preferred embodiments, said worm shaft and said worm wheel are mutually configured to prevent back-driving of said worm shaft by said worm wheel, wherein the mutual configuration typically comprises a friction angle between a worm of the worm shaft and the worm wheel being larger that a lead angle of the worm.

In preferred embodiments, said coupling means is configured to selectively couple the drive mechanism to a rotatable shaft that is part of, or coupled to, the rotor and is rotatable about a first axis, and wherein said drive mechanism has a rotational drive axis that is coincident with said first axis in use, and wherein, preferably, said rotation drive axis corresponds to the rotational axis of said worm wheel.

Typically, said rotor includes a rotor shaft, and said rotatable shaft may be said rotor shaft or a stub shaft coupled to and coaxial with said rotor shaft, or an extension of said rotor shaft.

In preferred embodiments, said coupling means comprises a drive-engaging portion that is connected or connectable to the drive mechanism, and a rotor-engaging portion that is configured for releasable coupling with said rotor. Said drive-engaging portion may be connected or connectable to said worm wheel. The drive-engaging portion may comprise at least one support structure configured for connection with the worm wheel, conveniently to an exposed side of the worm wheel or to an exposed cover fixed to a side of the worm wheel, and for supporting the rotor-engaging portion.

Said drive-engaging portion may comprise a hub, which may be plate-like in form and/or may be disc-shaped.

Said rotor-engaging portion may be configured to releasably interlock with said rotatable shaft such that rotation of said rotor-engaging portion is imparted to said rotatable shaft. Optionally, said rotor-engaging portion has at least one male or female interlocking formation configured to interlock with at least one corresponding female or male interlocking formation provided on said rotatable shaft, and/or wherein said rotor-engaging portion and said rotatable shaft are correspondingly shaped for interlocking. Optionally, said rotor-engaging portion is movable into and out of engagement with said rotatable shaft in an axial direction.

Optionally, said rotor-engaging portion is configured to interlock with said rotatable shaft in only one relative rotational orientation of said rotor-engaging portion and said rotatable shaft.

Optionally, said rotor-engaging portion and said rotatable shaft are each provided with a respective corresponding key formation, the corresponding key formations being configured to allow said rotor-engaging portion is configured to interlock with said rotatable shaft in only one relative rotational orientation of said rotor-engaging portion and said rotatable shaft.

Optionally, said rotor-engaging portion is configured to interlock with said rotatable shaft in a plurality of relative rotational orientations of said rotor-engaging portion and said rotatable shaft. Said rotor-engaging portion and said rotatable shaft may each be provided with a plurality of corresponding spline formations, the spline formations preferably being circumferentially spaced-apart around a respective portion of said rotor-engaging portion and said rotatable shaft, and preferably extending in an axial direction.

Optionally, said rotor-engaging portion may comprise any one of: a locking device; a locking pin, a projection or a socket.

Optionally, said rotatable shaft comprises a projecting portion or a socket portion for engaging with said rotor-engaging portion.

Optionally, said rotor-engaging portion is separately formed from said drive-engaging portion, and is configured for releasable interconnection with said drive-engaging portion. Said drive-engaging portion may be shaped to define an aperture through which said rotor-engaging portion extends when interconnected with said drive engaging portion.

Alternatively, said rotor-engaging portion may be integrally formed with, or permanently fixed to, said drive engaging portion, and preferably projects perpendicularly from said drive engaging portion.

Optionally, said drive-engaging portion can be connected to the drive mechanism in either one of a first orientation in which said rotor-engaging portion extends towards said rotor, or a second orientation in which said rotor-engaging portion extends away from said rotor.

Optionally, said drive-engaging portion and said rotor-engaging portion are configured such that, when said drive-engaging portion is connected to said drive mechanism, said rotor-engaging portion extends along an axis that is co-axial with the rotational axis of said rotatable shaft.

Said drive mechanism typically has a body that is shaped to define an aperture, and when said drive-engaging portion is connected to said drive mechanism, said rotor-engaging portion preferably extends into and optionally though said aperture of said body.

In preferred embodiments, said drive mechanism has a body that is shaped to define an aperture, and wherein when said drive-engaging portion is connected to said drive mechanism, said rotatable shaft extends into and optionally though said aperture of said body.

Typically, said drive mechanism includes, or is connectable to, a device for driving said drive mechanism, wherein the driving device may comprising a powered driving device or a manually operated driving device.

Optionally, the device includes a bearing hub for connecting said drive mechanism to said material processing device, wherein said bearing hub is coupled to said drive mechanism and rotatably supports said rotatable shaft.

From another aspect, the invention provides a material processing apparatus comprising a material processing device supported by a chassis or base, and the rotor rotating device of the first aspect of the invention coupled to said material processing device for controlling rotation of the rotor of the material processing device. Typically, a rotatable shaft connected to said rotor is supported by a bearing mount, said rotor rotating device being coupled to said bearing mount and to said rotatable shaft. Typically, said drive mechanism comprises a body that supports said worm shaft and said worm wheel, and wherein said body is coupled to said bearing mount and said worm wheel is coupled to said rotatable shaft.

In preferred embodiments, said material processing device includes or is connectable to drive means for rotating said rotor in normal use of said material processing device, said drive means being coupled to a driven end of said rotor, and wherein said rotor rotating device is coupled to a non-driven end of said rotor.

In some embodiments, said material processing device is a crusher, optionally an impact crusher.

Advantageously, the rotor rotation device is operable in a driving state in which it may be used to effect controlled (e.g. in terms of speed and/or angular displacement) rotation of the rotor (preferably in either rotational direction). This facilitates maintenance of the crusher (or other material processing device), e.g. to help clear a blockage or provide access to parts of the rotor or chamber that are otherwise difficult to access. Advantageously, the worm drive mechanism cannot be back-driven by the rotor as a result of which the worm drive mechanism serves as a brake or lock against unwanted or uncontrolled rotation of the rotor. Typically, the primary drive mechanism of the crusher (or other material processing apparatus (i.e. the primary drive mechanism that is typically provided in addition to the rotor rotation device) is disabled or disconnected, as required, when the rotor rotational device is in use.

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

Figure 1:
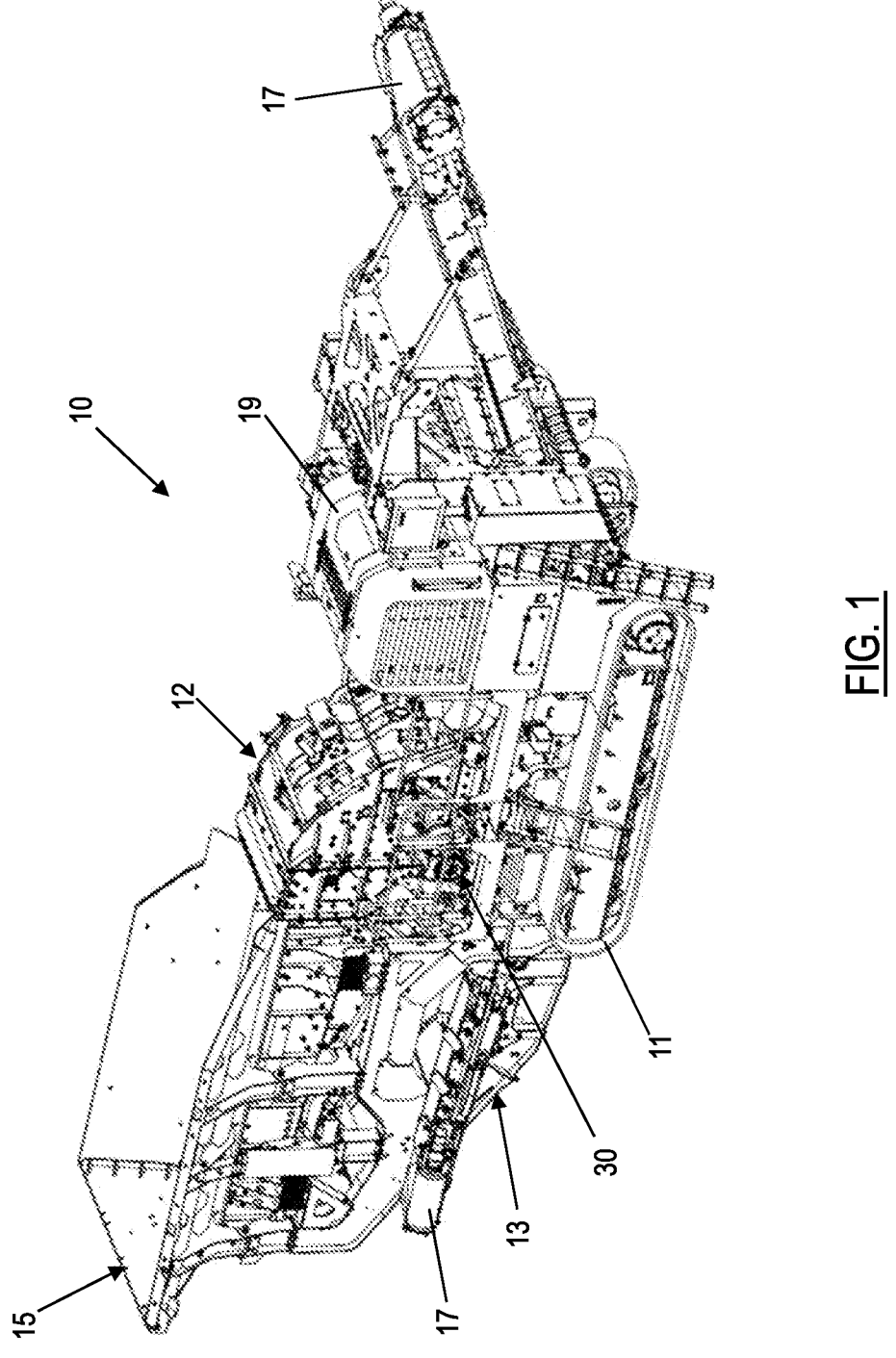
FIG. 1 is a perspective view of a material processing apparatus embodying one aspect of the invention and which may include a rotor rotating device embodying another aspect of the invention.

Referring now in particular to FIG. 1 of the drawings, there is shown, generally indicated as 10, a material processing apparatus. Only those parts of the apparatus 10 that are helpful for understanding the present invention are shown and described. In general, the apparatus 10 may be configured to perform any one or more of a plurality of material processing tasks, such as feeding, screening, separating, crushing, milling, waste recycling or demolition and/or washing, on one or more types of aggregate or other material, for example rocks, stones, gravel, sand and/or soil, or any other material that is quarried, mined or excavated. To this end, the apparatus 10 includes a material processing device 12 configured to perform the relevant material processing task(s). Embodiments of the invention are suited for use with a variety of different types of material processing device, in particular those that include a rotor, for example crushers (in particular impact crushers), shredders and milling devices. The rotor may be a material processing component, e.g. the crushing rotor of an impact crusher, or may be a rotary operating device. For example, in the case of an impact crusher, a shredder or a milling device, the rotor may comprise a rotatable drum or other rotatable structure which may have one or more blades, teeth or other formations to facilitate the respective material processing operation, whereas in the case of a jaw crusher the rotor may comprise a rotary operating device that is rotated to effect movement of a crushing jaw. In the embodiment illustrated and described herein, the material processing device 12 is a crusher, in particular an impact crusher. It will be understood however that the invention is not limited to impact crushers or crushers in general and that the same or similar description applies to other material processing devices as would be apparent to a skilled person.

The apparatus 10 is typically but not necessarily mobile and so may be provided on a chassis 13. The chassis 13 may carry one or more other components that facilitate use of the crusher 12, usually a feed assembly 15 for delivering material to the crusher 12 and one or more conveyors 17 for transporting crushed or uncrushed material, e.g. for the purposes of stockpiling. The feed assembly 15 may comprise a hopper and/or a screen. In a typical arrangement, material deposited into the hopper is graded by the screen as a result of which some of the material (usually the larger pieces that do not pass through the screen) is fed to the crusher 12 while the rest bypasses the crusher 12 and is directed elsewhere, e.g. to a conveyor.

The powered components of the apparatus 10, including the crusher 12, are typically powered by a power system which may include one or more hydraulic system comprising motor(s), actuator(s) and/or an internal combustion engine and/or other components as required. It will be understood that alternative power systems, e.g. electrical or pneumatic power systems, may be used, and so the motor(s) and other components may be powered by alternative means. An electrical system may also be provided as would be apparent to a skilled person. In the illustrated embodiment, the apparatus 10 includes power plant 19 for generating the requisite power (e.g. including electrical, hydraulic and/or pneumatic power as applicable) for the apparatus 10. The power plant 19 may take any convenient conventional form, e.g. comprising any one or more of an engine, e.g. an internal combustion engine, electric motor(s), compressor and/or batteries.

In embodiments in which the apparatus 10 is mobile one or more wheels and/or tracks 11 are provided on the chassis 13. The apparatus 10 may be self-propelled and to this end the power plant 19 usually comprises an internal combustion engine. In such cases, the internal combustion engine conveniently generates power for the hydraulic system(s), e.g. by operating the hydraulic pump(s) (not shown), and may also power an electric generator (not shown) for the electrical system, and/or may drive, directly or indirectly, the crusher 12.

Figure 2:
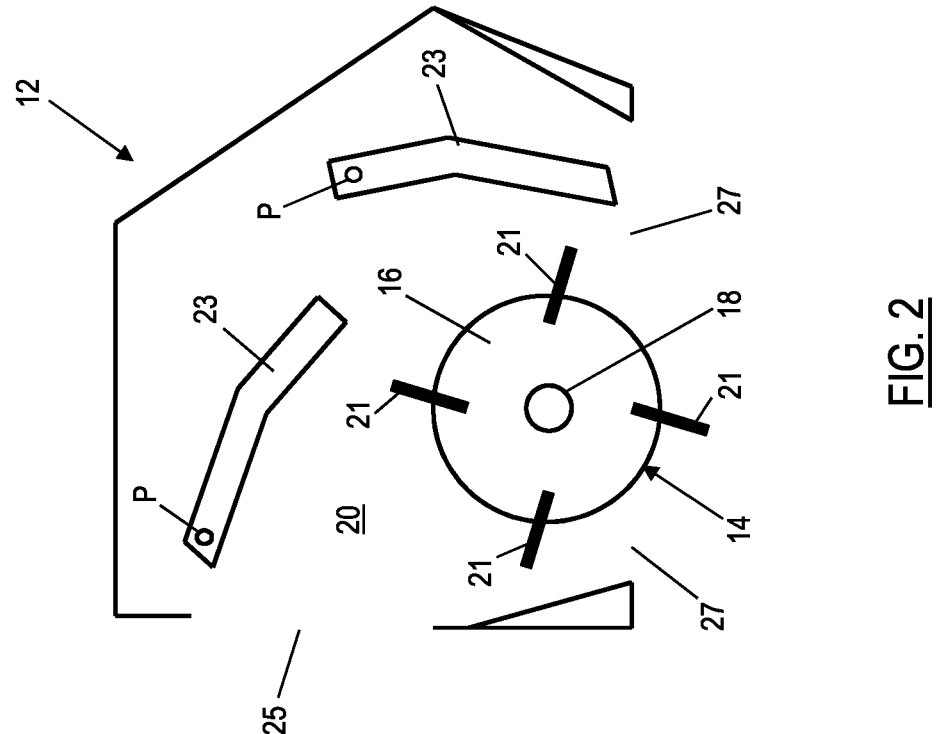
FIG. 2 is a schematic view of a crusher with which rotor rotating devices embodying the invention are suitable for use.

Referring now to FIG. 2, an exemplary embodiment of the crusher 12 is shown schematically. The crusher 12 includes a rotor 14 comprising a rotatable drum 16 (or other rotatable structure), which may include projections 21 (often referred to as blow bars) or other formations on its outer surface to facilitate crushing. The rotor 14 includes a shaft 18 on which the drum 16 (or other rotatable structure) is mounted. The shaft 18 and/or the drum 16 are rotatable about an axis A1 (FIG. 5), which is typically horizontally disposed in use, in at least one but preferably both rotational directions. The drum 16 and shaft 18 may be rotatable together about the axis A1 (i.e. the shaft 18 is rotatable), or the drum 16 may rotate about the shaft (i.e. the shaft 18 is fixed). The rotor 14 is located in a crushing chamber 20, and is rotatable within the chamber 20 about axis A1. One or more impact aprons 23 may be provided in the chamber 20 to provide impact surface(s) against which material may be crushed. The apron(s) 23 are typically movable (e.g. pivotable about pivot points P in the illustrated example) in order to adjust the spacing between the apron 23 and the rotor 14 in order to adjust the crushing operation. The apron(s) 23 may be moved using any convenient actuating mechanism (not shown). In use, material (not shown) to be crushed is fed into the chamber 20 via inlet 25 and, as the rotor 14 rotates, the material is thrown back and forth between the rotor 16 and other internal surfaces within the chamber 20 (e.g. the internal wall(s) of the chamber 20 and/or the impact surface(s) of the apron(s)), which has the effect of crushing the material. When the material has been crushed into small enough particles, it exits the chamber 20 via outlet 27, typically under the influence of gravity. The chamber 20 may have one or more hatch, door or removable panel, which may be opened to allow access to the inside of the chamber 20, e.g. for the purposes of maintenance.

In normal use, the rotor 14 is drive (rotated) by a powered drive system (not shown), which may for example be powered by the power plant 19. The powered drive system may take any conventional form. For example, the drive system may for example comprise a motor, e.g. a hydraulic motor, mounted at an end of the rotor 14 and being operable to rotate the rotor 14. Alternatively, or in addition, the drive system may comprise an internal combustion engine, or other drive mechanism, coupled to the rotor 14, e.g. by a belt and pulley system (not shown) having a driven pulley on the rotor 14 and driving pulley on the drive shaft of the motor/engine. The powered drive system is used to drive the material processing device 12 when performing its normal function, e.g. crushing in the illustrated example.

Figure 3:
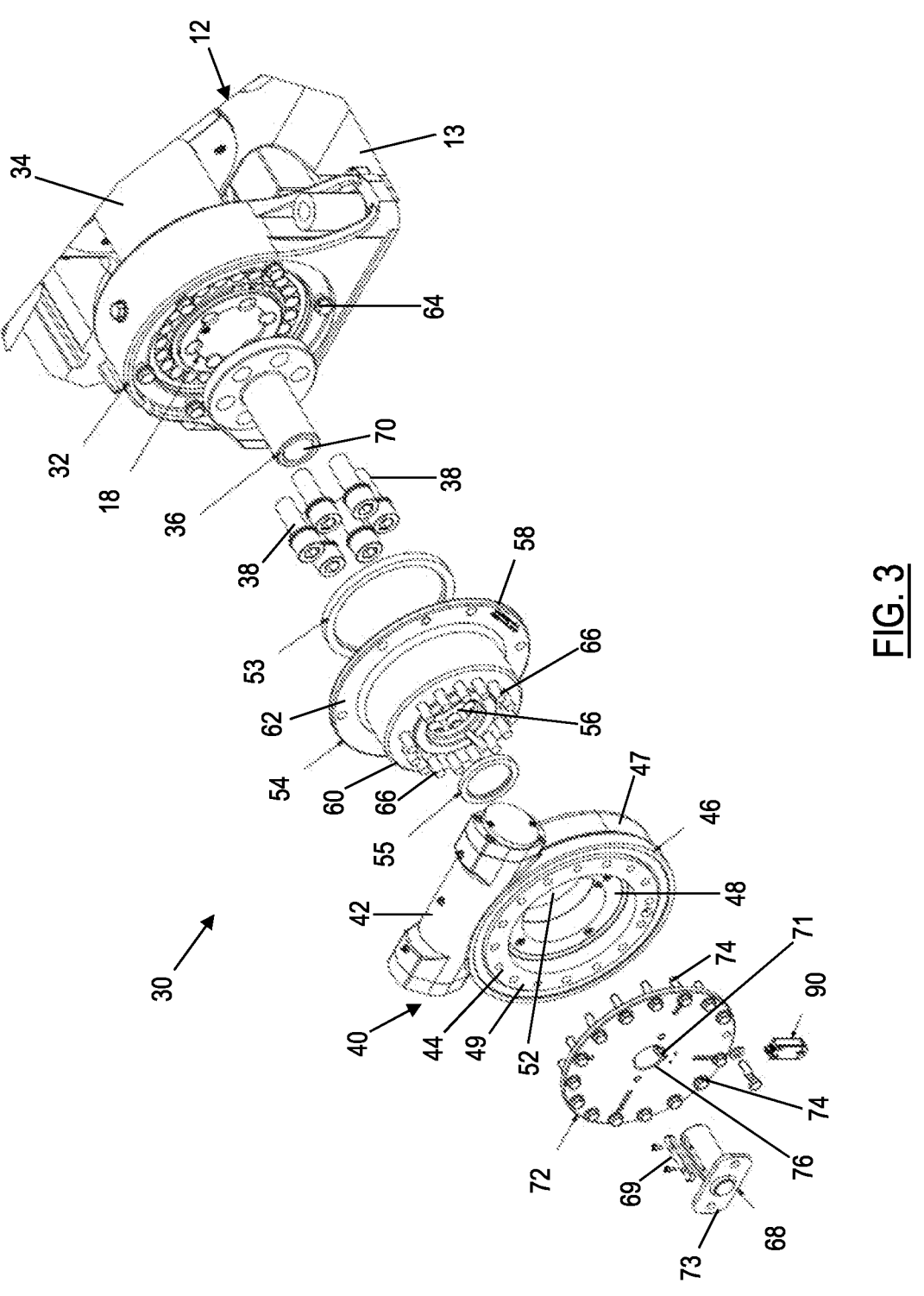
FIG. 3 is an exploded perspective view of a first embodiment of the rotor rotating device and an external part of a material processing device that includes a rotor.
Figure 4:
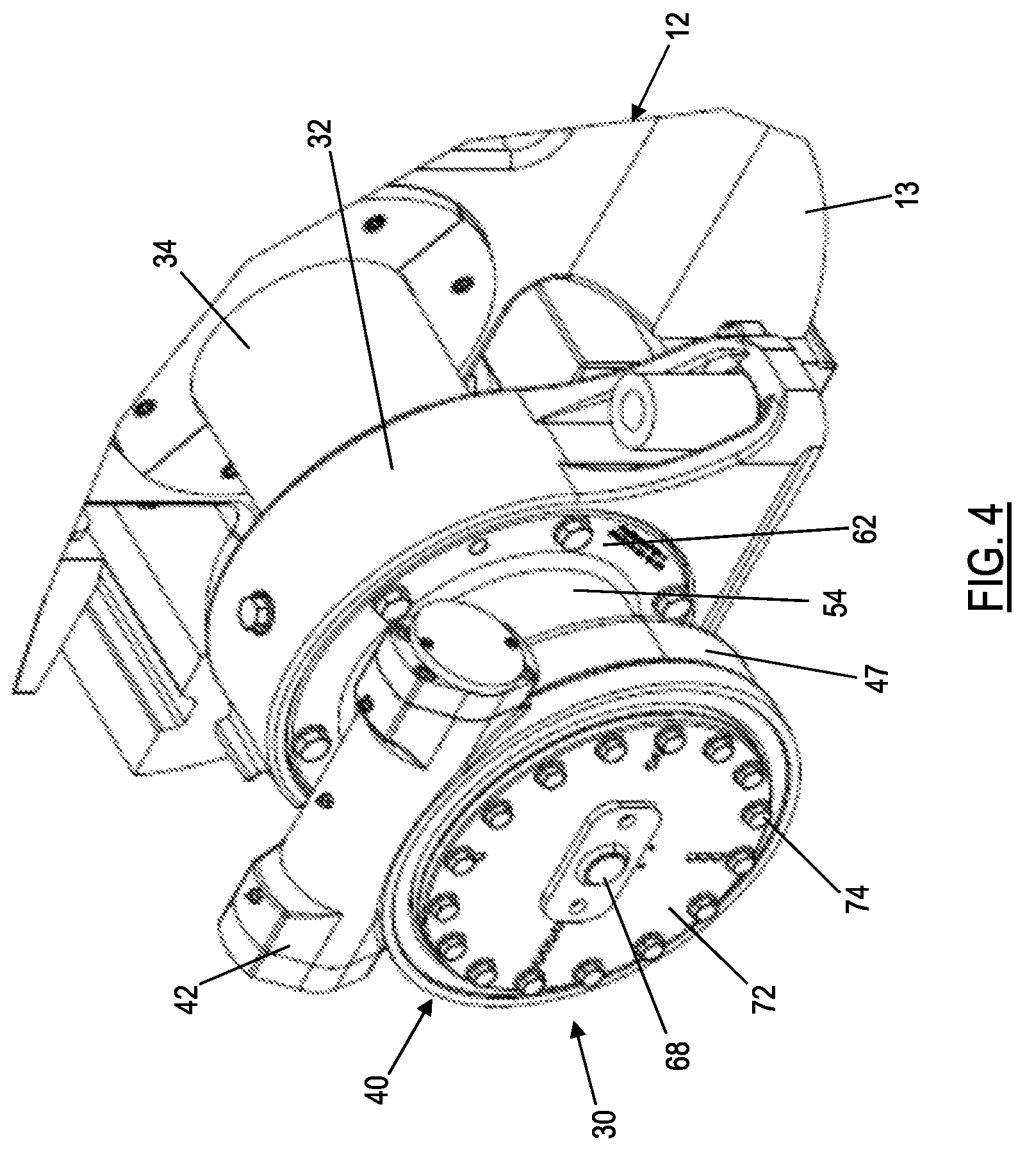
FIG. 4 is a perspective view of the first embodiment of the rotor rotating device shown mounted on the external part of the material processing device.
Figure 5:
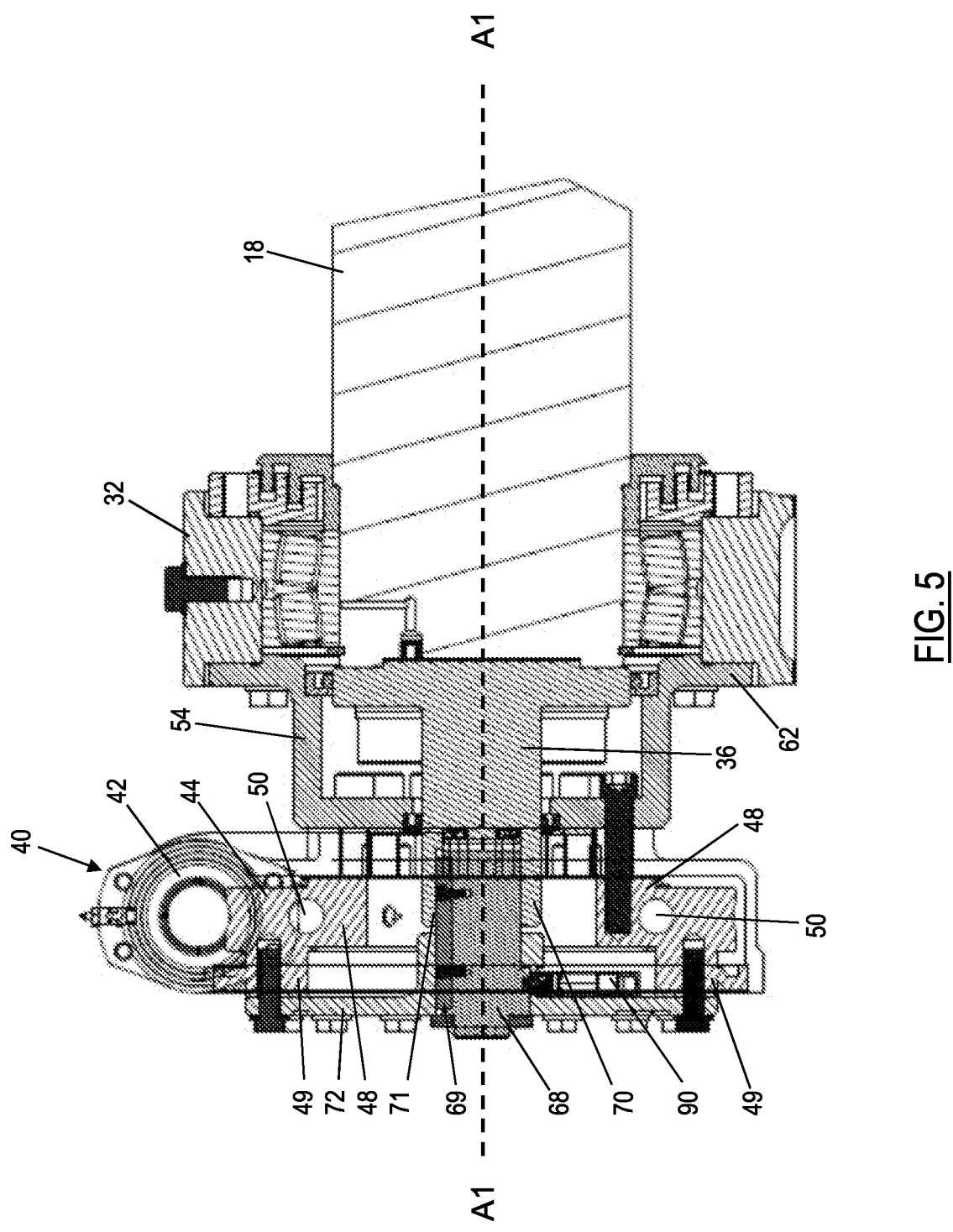
FIG. 5 is a side sectioned view of the first embodiment of the rotor rotating device shown mounted on the external part of the material processing device.

Referring now in particular to FIGS. 3 to 5, there is shown a first rotor rotating device 30 embodying the invention. Advantageously, the rotor rotating device 30 is provided in addition to the powered drive system in order to rotate the rotor 14 in circumstances other than the normal use of the material processing device 12. Also shown in FIGS. 3 to 5 is part of the material processing device 12 to which the rotor rotating device 30 is coupled in use, which in preferred embodiments comprises part of the rotor shaft 18, typically an end part. The rotor shaft 18 is rotatably supported in a bearing mount 32. In alternative embodiments, e.g. in which the shaft 18 is not rotatable, any other suitable rotating part of the rotor 14 may be rotatably supported by the bearing mount 32, e.g. a shaft, sleeve or other structure that is connected to and rotatable with the rotor 14. Typically, the end of the shaft 18 (or other rotating part) supported by the bearing mount 32 is the non-driven end. In alternative embodiments (not illustrated), the device 30 may be coupled to a shaft/bearing mount at the driven end. The shaft 18 (or other rotating part) extends from the chamber 20, typically along axis A1, and may be located in a housing 34. The bearing mount 32 is fixed with respect to the chamber 20. The bearing mount 32 may be mounted (directly on indirectly) on the chassis 13 or other base/structure that supports the material processing device 12. The bearing mount 32 may be of any suitable conventional type, e.g. comprising ball bearings, roller bearings or any other conventional bearing arrangement, that allows the shaft 18 (or other rotating part) to rotate (about axis A1 in this example).

In typical embodiments, a stub shaft 36 is connected to the end of the shaft 18 (or other rotating part). The stub shaft 36 projects outwardly from the bearing mount 32, typically along the rotational axis of the shaft 18 (i.e. axis A1 in the illustrated example). The stub shaft 36 may be fixed to the shaft 18 by any convenient fixing means (e.g. screws 38 in the illustrated example) and rotates with the shaft 18. The stub shaft 36 serves as an extension of the shaft 18 and provides a rotatable part with which the rotor rotating device 30 selectively interacts, as is described in more detail hereinafter. In alternative embodiments, the end of the shaft 18 (or other rotating part) may project outwardly from the bearing mount 32, in which case the stub shaft 36 may be omitted since the projecting end of the shaft 18 (or other rotating part) can provide the rotatable part with which the rotor rotating device 30 selectively interacts.

In use, the rotor rotating device 30 is coupled to, or otherwise fixed with respect to, the bearing mount 32, and is selectively coupled to the rotor 14 in order to rotate the rotor 14 when coupled thereto. The preferred arrangement is that the device 30 is mounted (directly or indirectly) on, or otherwise supported by, the bearing mount 32. Alternatively, the device 30 may be mounted on, or supported by, another part of the material processing device 12 or apparatus 10. In either case, the rotor rotating device 30 is arranged such that it can selectively couple with the rotor 14 (in particular the shaft 18, stub shaft 36 or other rotatable part as applicable) in order to rotate the rotor 14 when required.

The rotor rotating device 30 comprises a drive mechanism 40 for selectively rotating the rotor 14. Advantageously, the drive mechanism 40 comprises a worm drive mechanism. The worm drive mechanism 40 comprises a worm shaft 42 and a corresponding worm wheel 44 (also called a worm gear). The worm shaft 42 comprises a worm, being a screw-shaped formation which may be referred to as a gear in the form of a screw, or a worm screw. Corresponding gear formations, or teeth, are provided around the worm wheel 44 which intermesh with the worm of the worm shaft 42. The worm acts as a driver for the worm wheel 44 whereby rotation of the worm shaft 42 about its longitudinal axis causes rotation of the worm wheel 44. Typically, the configuration is such that the worm shaft 42 can drive the worm wheel 44 in both rotational directions, i.e. rotation of the worm shaft 42 in one direction causes the worm wheel 44 to rotate in a first direction, while rotation of the worm shaft 42 in the other direction causes the worm wheel 44 to rotate in a second direction opposite to the first direction. The rotational axis of the worm wheel 44 (which is coincident with axis A1 in preferred embodiments) is perpendicular to the longitudinal axis of the worm shaft 42. The worm shaft 42 may be rotated by any convenient drive means (not shown), which may be manually operable (e.g. comprising a handle or other manual operating device) or power operable (e.g. comprising a motor, for example a hydraulic or electric motor). In preferred embodiments, the worm drive mechanism is a slewing drive mechanism, and the worm wheel 44 is a slewing ring, as is described in more detail hereinafter. Alternatively, other conventional types of worm drive mechanism, e.g. comprising a worm gearbox, may be used. While the worm wheel 44 may be referred to as a worm gear, the term "worm gear" may also be used to refer to the combination of the worm shaft and worm wheel.

Advantageously, the worm drive mechanism 40 is configured such that the worm wheel, or slew ring, 44 is not able to drive the worm shaft 42, i.e. to prevent back driving. This may be achieved by designing the drive mechanism 40 such that the coefficient of friction between the worm wheel or slewing ring 44 and the worm is larger than the tangent of the worm's lead angle, i.e. that the friction angle between the worm and the worm gear is larger than the worm's lead angle. Because the worm shaft 42 cannot be back driven by the worm wheel 44, the drive mechanism 40 may be said to be self-locking. To facilitate self-locking, it is preferred that the worm comprises a single helix (which is sometimes referred to as a single-start worm). Advantageously, the drive mechanism 40 provides a large speed reduction and high torque multiplication from input to output. Moreover, the drive mechanism 40 can provide a relatively high reduction ratio in a relatively compact structure compared to, for example, a circular gear and bevel gear transmission. Advantageously, the drive mechanism 40 has a high load capacity and can provide reliable rotational positioning of the rotor 14.

The rotor rotating device 30 comprises a body 46 that supports the drive mechanism 40, typically being configured to house the worm shaft 42 and worm wheel 44. In preferred embodiments where the drive mechanism 40 is a slewing drive mechanism, the slewing ring 44 is rotatably supported by the body 46. The body 46 typically comprises a housing 47 in which the slewing ring 44 is rotatably located, typically being supported by one or more bearing to facilitate rotation. The housing 47 may include an annular plate 49 (sometimes referred to as a top plate) or other cover that is fixed to the slewing ring 44 and rotates with the slewing ring 44. The plate 49 is exposed to serve as an interface by which other components may be connected to the slewing ring 44, and to this end may include sockets or apertures for receiving bolts screws or other fixings. Alternatively, the side of the slewing ring 44 may itself be exposed as an interface for connection to other components. The slewing ring 44 is typically located coaxially around a hub 48, which typically comprises an inner ring, and about which the slewing ring 44 is, usually, rotatable. The hub 48 may be part of, or located in, the housing 47 as is convenient, and is fixed with respect to the body 46. One or more bearings 50 are typically provided between the slewing ring 44 and the hub 48 to facilitate rotation of the slewing ring 44. In preferred embodiments, the body 46 is annular, defining a central aperture 52 through which the rotational axis of the slewing ring 44 extends. The worm shaft 42 is typically also supported by the body 46, and may be incorporated into the housing 47.

In use, the body 46 is coupled to, or otherwise fixed with respect to, the bearing mount 32. The preferred arrangement is that the body 46 is mounted (directly or indirectly) on, or otherwise supported by, the bearing mount 32. Alternatively, the body 46 may be mounted on or supported by another part of the material processing device 12 or apparatus 10. The preferred arrangement is such that the axis A1 passes through the aperture 52, preferably being coincident with the rotational axis of the slewing ring 44. Preferably, the arrangement is such that the shaft 18, stub shaft 36 or other relevant rotatable part, as applicable, is at least aligned with, and preferably extends into, the central aperture 52 of the body 46 (as can best be seen from FIG. 5).

In the illustrated embodiment, the rotor rotating device 30, and in particular the body 46, is coupled to the bearing mount 32 by a fixed bearing hub 54. The bearing hub 54 is annular, defining a central aperture 56, and has one end 58 fixed to the bearing mount 32 and the opposite end 60 fixed to the body 46. The preferred arrangement is such that the aperture 56 is aligned with the aperture 52, and axis A1 extends through the apertures 52, 56. In the illustrated embodiment, the end 58 comprises an annular flange 62 that is fixed to the bearing mount 32 around the rotor shaft 18 by any convenient fixing means, e.g. bolts or screws 64. The opposite end 60 may be fixed to the hub 48 by any convenient fixing means, e.g. bolts or screws 66. Typically, primary and secondary shaft seals 53, 55 are fitted between the stub shaft 36 and the bearing hub 54.

The preferred arrangement is such that the shaft 18, stub shaft 36 or other relevant rotatable part, as applicable, extends through the bearing hub 54 (and may be rotatably supported by the bearing hub 54 in any conventional manner), preferably projecting from the end 60 such that its free end is located within the central aperture 52 of the body 46 (as can best be seen from FIG. 5).

The rotor rotating device 30 includes means for selectively coupling the drive mechanism 40 to the rotor 14. In particular, the selective coupling means is configured to selectively couple the slewing ring 44 to the shaft 18, stub shaft 36 or other rotatable part as applicable, to enable the drive mechanism 40 to rotate the rotor 14 when required. In preferred embodiments, the selective coupling means comprises a drive-engaging portion and a rotor-engaging portion, which may be integrally form with each other, or separately formed and inter-engageable. The drive-engaging portion is configured for connection to the slewing ring 44 (e.g. via plate 49 if present), and the rotor-engaging portion is configured for connection to the shaft 18, stub shaft 36 or other rotatable part as applicable.

As illustrated in the embodiment of FIGS. 3 to 5, the rotor-engaging portion may comprise a locking device 68 configured to interlock with the stub shaft 36. The stub shaft 36 and the locking device 68 may be configured to interlock in any convenient manner, e.g. being provided with one or more corresponding male and female interlocking formation(s), or by being mutually shaped for male-to-female interlocking connection. In preferred embodiments, the interlocking is such that rotation of the locking device 68 (about its axis that is coincident with A1 in the illustrated example) causes corresponding rotation of the stub shaft 36 and therefore of the rotor 14, i.e. that the locking device 68 and shaft 36 cannot rotate relative to each other. It is preferred however that the interlocking does not prevent the locking device 68 from being moved into engagement with or out of engagement with the stub shaft 36 (which involves movement in the axial direction A1 in the illustrated example).

Optionally, the stub shaft 36 and the locking device 68 are shaped or otherwise configured to fit together and interlock in only one relative rotational orientation. This may be achieved in any convenient manner, e.g. by configuring the male and female interlocking formation(s) such that they only allow interlocking in one relative rotational orientation, or by shaping the stub shaft 36 and the locking device 68 such that they only allow interlocking in one relative rotational orientation. For example, in the embodiment of FIGS. 3 to 5, the locking device 68 comprises a locking pin having a key formation 69 (male or female). The stub shaft 36 is shaped to define a socket 70 for receiving the locking pin 68, the socket including a corresponding key formation 71 (female or male) such that the locking pin 68 can only be inserted into the socket 70 in one rotational orientation. Alternatively, the locking device 68 may be shaped to define a socket, and the stub shaft 36 may be shaped to define a pin or other projection that fits into the socket. In either case, the preferred arrangement is such that the locking device 68 can be moved into and out of engagement with the shaft 36 in the axial direction (along axis A1 in the illustrated example) and, when engaged, there is rotational interlocking between the shaft 36 and the locking device 68. Conveniently, the key formations 69, 71 serve to provide the rotational interlock between the locking device 68 and the stub shaft 36.

The locking device 68 is removably engagable with the stub shaft 36. When engaged, the interlocking between the locking device 68 and stub shaft 36 couples the drive mechanism 40 to the rotor 14 and allows the rotor 14 to be rotated by the device 30. When the locking device 68 is disengaged, there is no coupling between the drive mechanism 40 and the rotor 14 such that the rotor 14 cannot be rotated by the device 30. It will be understood that in alternative embodiments in which the stub shaft 36 is not present, the foregoing description applies to the rotor shaft 18 or other relevant rotatable part, as applicable and as would be apparent to a skilled person.

As illustrated in the embodiment of FIGS. 3 to 5, the drive-engaging portion may comprise one or more support structure 72 configured for connection with the slewing ring 44 and for supporting the rotor-engaging portion 68 (at least when the rotor-engaging portion 68 is engaged with the stub shaft 36 (or other relevant rotatable part as applicable)). The support structure 72 is conveniently connected (releasably or permanently) to the exposed side of the slewing ring 44 (or plate 49 if present). The preferred arrangement is such that the exposed side of the slewing ring 44 (or plate 49 if present) faces away from the rotor 14.

In the embodiment of FIGS. 3 to 5, the support structure 72 comprises a locking hub, which may be plate-like in form, and which may be disc-shaped. The locking hub 72 may be fixed to the slewing ring 44 by any convenient fixing means, e.g. screws 74 or the like, or may be integrally formed with the slewing ring 44. For example, as illustrated in FIGS. 3 to 5, the hub 72 may be shaped and dimensioned to cover the exposed side of the slew ring 44 (or plate 49) and to be fixed thereto around the respective peripheries.

The support structure 72 may be configured to support the locking device 68 in any convenient manner. In the embodiment of FIGS. 3 to 5, the support structure 72 and locking device 68 are formed separately and can be releasably interconnected. For example, the support structure 72 may include an aperture 76 through which the locking device 68 may be inserted, the locking device 68 including one or more formation (e.g. flange 73) by which it may be releasably connected to the structure 72 by any convenient fixing means, e.g. screws bots or the like, when the locking device 68 is inserted into the aperture 76. Optionally, the aperture 76 includes a key formation 78 that corresponds to the key formation 69 on the locking device 68 so that the locking device 68 can only pass through the aperture 76 in one rotational orientation, e.g. when the key formations 69, 78 are aligned. Typically, the support structure 72 is fixed to the slewing ring 44 after which the locking device 68 is inserted though the aperture 76 and fixed to the support structure 72. In embodiments where the key formation 78 is present, the slewing ring 44 may need to be rotated to align the key formation 78 with the corresponding key formation 71 of the stub shaft 36 so that the locking device 68 is correctly rotationally aligned with the stub shaft 36 when it is inserted through the aperture 76.

Figure 6:
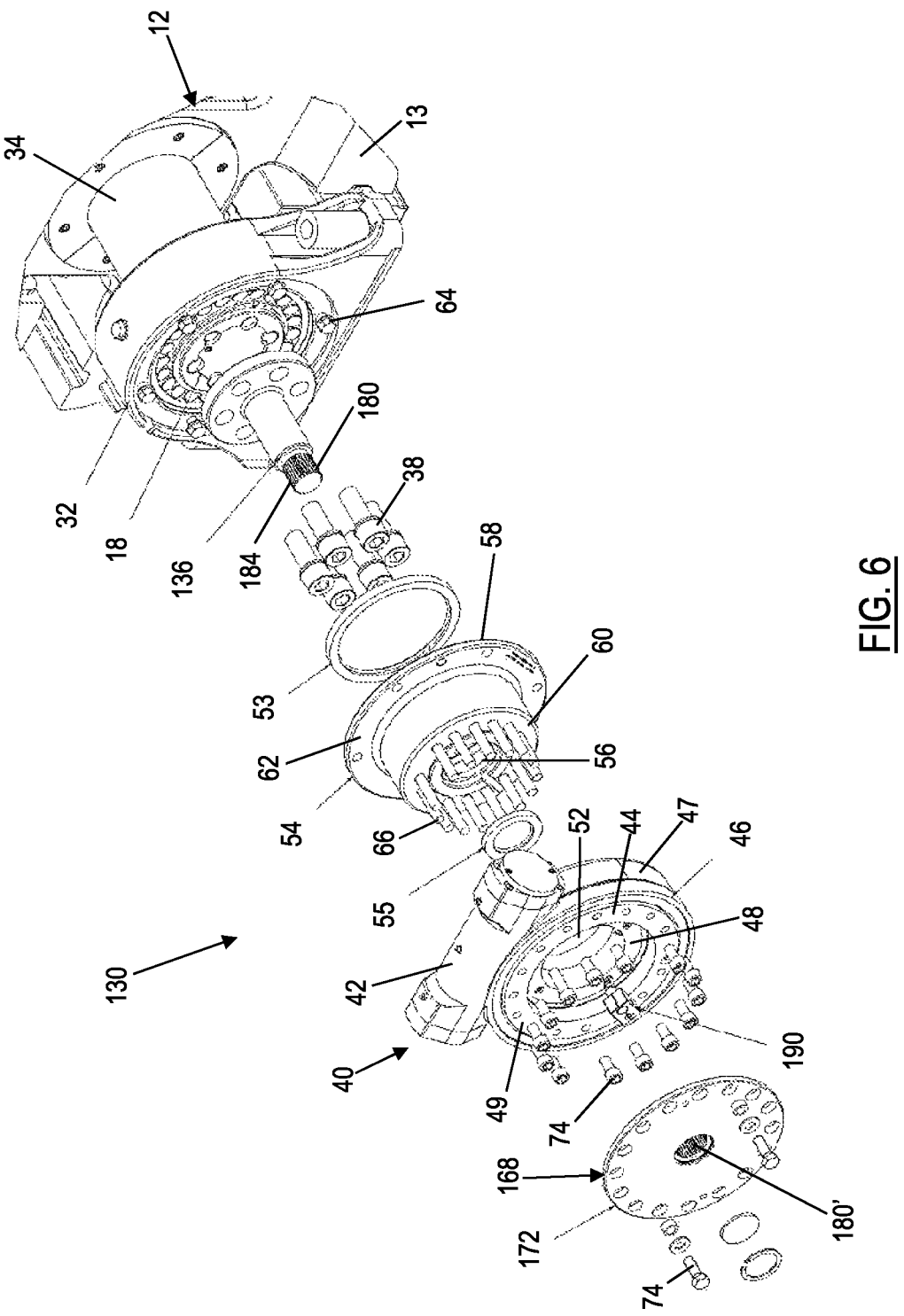
FIG. 6 is an exploded perspective view of a second embodiment of the rotor rotating device and an external part of a material processing device that includes a rotor.
Figure 7:
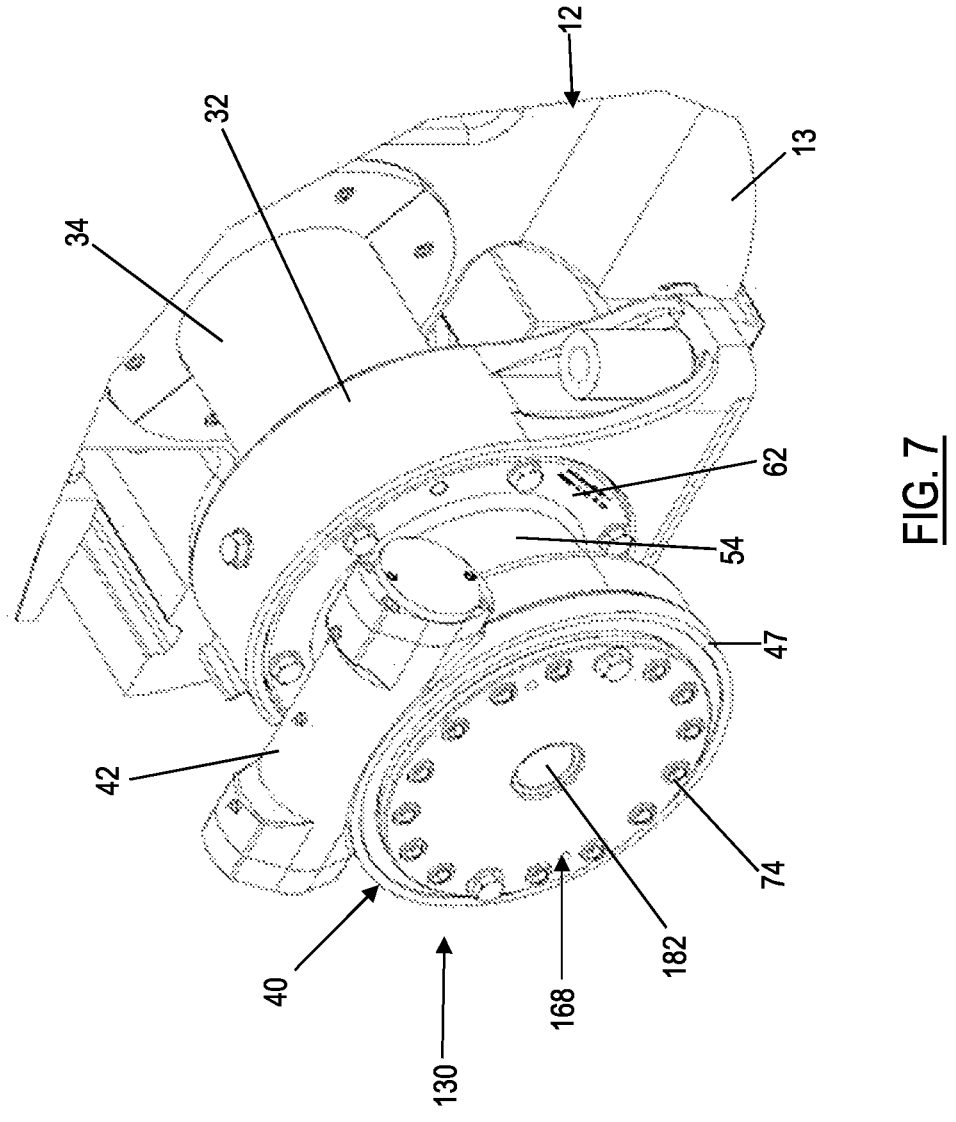
FIG. 7 is a perspective view of the second embodiment of the rotor rotating device shown mounted on the external part of the material processing device.

An alternative embodiment of the rotor rotating device 130 is shown in FIGS. 6 to 8 in which like numerals are used to denote like parts and in respect of which the same or similar description applies, unless otherwise indicated, as is provided in relation to the first rotor rotating device 30 as would be apparent to a skilled person.

The rotor rotating device 130 is substantially the same as the rotor rotating device 30 except that alternative means for selectively coupling the drive mechanism 40 to the rotor 14 are provided. In particular, the stub shaft 136 (or shaft 18 or other relevant rotational part as applicable) and the locking device 168 are configured to interlock in any one of a plurality of relative rotational orientations. This may be achieved in any convenient manner, e.g. by providing each component 136, 168 with a respective plurality of corresponding male and female interlocking formations, or by having engagable portions that are shaped for male-to-female interlocking connection in a plurality of relative rotational orientations (e.g. providing the engageable portions with a corresponding regular polygonal transverse cross-section). In the embodiment of FIGS. 6 to 8, the respective engaging portion of the shaft 136 and of the locking device 168 is provided with a plurality of corresponding spline formations 180, 180' that inter-engage to provide the required rotational interlock when the respective engaging portions are inter-engaged. Preferably, the spline formations 180, 180' are provided around the periphery of the respective engaging portion (typically circumferentially), and preferably extend in a longitudinal direction (parallel with axis A1 in the present example). The number relative rotational orientations in which the shaft 136 and locking device 168 can be interlocked is determined by the number of spline formations provided, or the pitch between the spline formations. As illustrated in FIGS. 6 to 8, the engaging portion of the locking device 168 may comprise a socket 182 while the engaging portion of the shaft 136 may comprise a corresponding pin 184 or other projection shaped and dimensioned to fit the socket 182. Alternatively, the engaging portion of the stub shaft 136 may comprise the socket while the engaging portion of the locking device comprises the corresponding pin or other projection.

Optionally, the locking device 168 is integrally formed or permanently fixed to the support structure 172, which may be the same or similar to the support structure 72. Alternatively, the locking device 168 and support structure 172 may be separately formed and releasably interconnectable, for example in the same or similar manner to the locking device 68 and support structure 72.

Figures 8A, 8B:
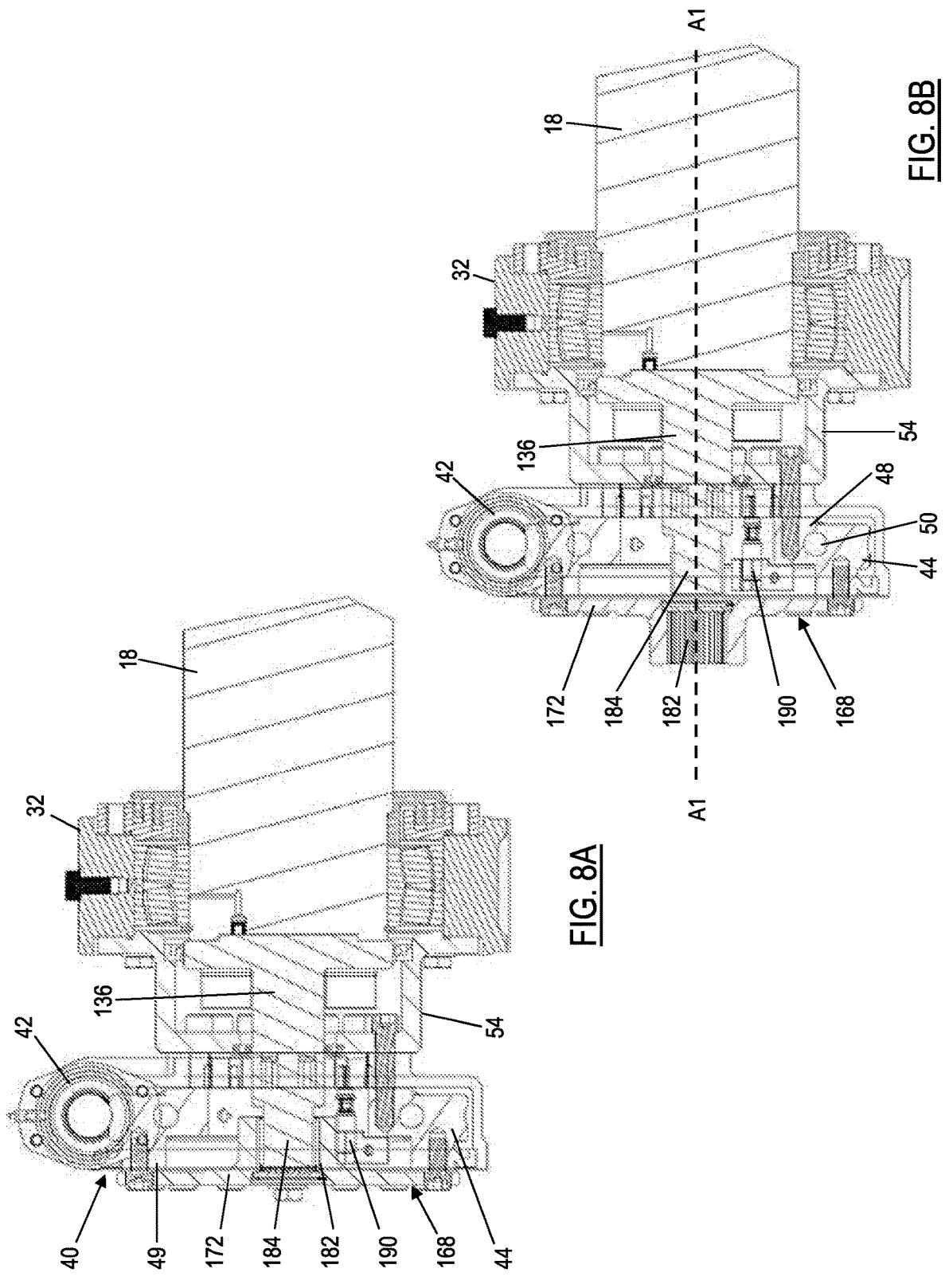
FIG. 8A is a side sectioned view of the second embodiment of the rotor rotating device shown mounted on the external part of the material processing device and in a driving state.
FIG. 8B is a side sectioned view of the second embodiment of the rotor rotating device shown mounted on the external part of the material processing device and in a non-driving state.

With reference in particular to FIGS. 8A and 8B, in preferred embodiments the support structure 172 and locking device 168 can be connected to the drive mechanism 40 in either one of a locking orientation (FIG. 8A) or a non-locking orientation (FIG. 8B). In the locking orientation, the locking device 168 engages with the stub shaft 136 as described above. In the non-locking orientation, the locking device 168 projects away from the stub shaft 136 and does not engage with the stub shaft 136. Conveniently, adopting the locking or non-locking orientation is achieved by fixing the support structure 172 to the drive mechanism 40 in either one of two orientations, i.e. a first orientation in which the locking device 168 projects from the support structure 172 in a direction towards the shaft 136 (FIG. 8A), and a second orientation in which the locking device 168 projects from the support structure 172 in a direction away from the shaft 136 (FIG. 8B).

In preferred embodiments, when the support structure 72, 172 is connected to the slewing ring 44 the locking device 68, 168 is aligned with the axis A1 and projects from the support structure 72, 172 to allow it to engage with the stub shaft 36, 136 (unless it is in the non-locking orientation). Typically, the locking device 68, 168 extends into, and optionally through, the aperture 52 (as can best be seen from FIGS. 5 and 8A). In typical embodiments, the locking device 68, 168 and stub shaft 36, 136 engage in the central aperture 52, although in alternative embodiments they may engage outside of the aperture 52 depending on, for example, the respective lengths of the locking device 68, 168 and the stub shaft 36, 136. When interconnected, the support structure 72, 172 and locking device 68, 168 together connect the slewing ring 44 to the stub shaft 36, 136 to allow rotation of the slewing ring 44 to be transmitted to the rotor 14.

In use, when it is desired for the crusher 12 to operate normally, the rotor rotating device 30, 130 is configured to adopt a non-driving state in which the drive mechanism 40 is not coupled to the rotor 14 such that the rotor 14 is free to be rotated by the drive mechanism of the crusher 12. In the embodiment of FIGS. 3 to 5, the support structure 72 may remain fixed to the slewing ring 44 and the non-driving state may be achieved by removing or not installing the locking device 68. In the embodiment of FIGS. 6 to 8, the non-driving state may be achieved by fixing the support structure 172 to the slewing ring 44 in its non-locking orientation. When it is desired to use the rotor rotating device 30, 130 to control the rotation of the rotor 14 (e.g. during maintenance of the crusher 12), the rotor rotating device 30, 130 is configured to adopt a driving state in which the drive mechanism 40 is coupled to the rotor 14 such that rotation of the slewing ring 44 is transmitted to the rotor 14. In the embodiment of FIGS. 3 to 5, with the support structure 72 fixed to the slewing ring 44, to adopt the driving state the locking device 68 is inserted through the support structure 72 into interlocking engagement with the stub shaft 36, and is fixed to the support structure 72. In the embodiment, of FIGS. 6 to 8, the driving state is adopted by installing the support structure 172 and locking device 168 assembly in its locking orientation.

In the driving state, the rotor rotation device 30, 130 may be used to effect controlled (e.g. in terms of speed and/or angular displacement) rotation of the rotor 14 (preferably in either rotational direction). This facilitates maintenance of the crusher 12, e.g. to help clear a blockage or provide access to parts of the rotor 14 or chamber 20 that are otherwise difficult to access. Advantageously, because the drive mechanism 40 cannot be back-driven by the rotor 14, the drive mechanism 40 serves as a brake or lock against unwanted or uncontrolled rotation of the rotor 14. Typically, the drive mechanism of the crusher 12 (i.e. the primary drive mechanism that is typically provided in addition to the device 30, 130) is disabled or disconnected, as required, when the rotor rotational device 30, 130 is in use.

In preferred embodiments, a position sensor 90, 190 is provided for detecting if the rotor rotation device 30, 130 is in the driving state when the rotor rotational device 30, 130 is operational. The sensor 90, 190 may be configured to detect whether or not the locking device 68, 168 is interlocked with the stub shaft 36, 136. Any suitable conventional sensor type may be used for this purpose, e.g. a mechanical switch type sensor, an electrical field sensor, magnetic field sensor, light sensor, ultrasonic sensor, or other contact or non-contact sensor. Preferably, the sensor 90, 190 is a wireless sensor to facilitate providing it on rotatable components as required. The sensor 90, 190 may be configured to detect the locking device 68, 168 (or a specific part thereof) only when the locking device 68, 168 is in its interlocking position with the stub shaft 36, 136. For example, in the case of a contact sensor, the sensor 90, 190 may be positioned to make contact with the locking device 68, 168 (or a specific part thereof) only when the locking device 68, 168 is in its interlocking position. In the case of a non-contact sensor, the sensor 90, 190 may be positioned and calibrated to detect the locking device 68, 168 (or a specific part thereof) only when the locking device 68, 168 (or the specific part thereof) is in the sensor's detection field. In the embodiment of FIGS. 3 to 5, the sensor 90 is a contact sensor that is mounted on the support structure 72 and positioned to make contact with a formation (not visible) on the locking device 68 only when the locking device 68 is fixed to the structure 72 as described above. In the embodiment of FIGS. 6 to 8, the sensor 190 may be a contact or non-contact sensor and is provided on the body 46 and configured to detect the presence or absence of the locking device 168. When the rotor rotating device 30, 130 is in use, if the output of the sensor 90, 190 indicates that the device 30, 130 is not in the driving state, then the device 30, 130 may be configured to activate one or more alert(s) (e.g. activate visual and/or audio alarms) and/or to disable at least part of the operation of the device 30, 130 and/or issue an output signal to a remote device that controls the operation of the crusher 12, e.g. to disable the crusher if required. The device 30, 130 may be provided with any suitable controller (not shown) for co-operating with the sensor 90, 190 (which may for example be the same controller that controls the operation of the device 30, 130), and/or the sensor 90, 190 may be in communication with an external controller (not shown).

The invention is not limited to the embodiment(s) described herein but can be amended or modified without departing from the scope of the present invention.

The invention claimed is:

1. A material processing apparatus comprising:
a crusher comprising a rotor;
a powered drive system for rotating the rotor of the crusher to perform a crushing function; and
a rotor rotation device coupled to the crusher for controlling rotation of the rotor during maintenance of the crusher, the rotor rotation device comprising:
a drive mechanism; and
coupling means for selectively coupling the drive mechanism to the rotor;
wherein the rotor rotation device is operable in a driving state in which the coupling means couples the drive mechanism to the rotor to allow rotation of the rotor by the drive mechanism, or in a non-driving state in which the coupling means does not couple the drive mechanism to the rotor;
wherein the drive mechanism comprises a worm shaft and a worm wheel, the coupling means coupling the worm wheel to the rotor in the driving state; and
wherein the worm shaft and the worm wheel are mutually configured to prevent back-driving of the worm shaft by the worm wheel in the driving state.

2. The material processing apparatus of claim 1, wherein the worm shaft comprises only one worm.

3. The material processing apparatus of claim 1, wherein the drive mechanism comprises a slewing drive mechanism comprising the worm shaft and the worm wheel in the form of a slewing ring.

4. The material processing apparatus of claim 1, wherein a friction angle between a worm of the worm shaft and the worm wheel is larger than a lead angle of the worm in order to prevent back-driving of the worm shaft by the worm wheel.

5. The material processing apparatus of claim 1, wherein the rotor comprises a rotatable shaft that is rotatable about a first axis, wherein the coupling means is configured to selectively couple the drive mechanism to the rotatable shaft, and wherein the drive mechanism has a rotational drive axis that is coincident with the first axis in use.

6. The material processing apparatus of claim 1, wherein the coupling means comprises a drive-engaging portion that is connected to the drive mechanism, and a rotor-engaging portion that is configured for releasable coupling with the rotor, and wherein the drive-engaging portion comprises at least one support structure configured for connection with the worm wheel and for supporting the rotor-engaging portion.

7. The material processing apparatus of claim 6, wherein the rotor comprises a rotatable shaft that is rotatable about a first axis, wherein the coupling means is configured to selectively couple the drive mechanism to the rotatable shaft, and wherein the rotor-engaging portion is configured to releasably interlock with the rotatable shaft such that rotation of the rotor-engaging portion is imparted to the rotatable shaft.

8. The material processing apparatus of claim 7, comprising a male-to-female interlocking connection to releasably interlock the rotor-engaging portion with the rotatable shaft, wherein male-to-female interlocking connection comprises:
a male interlocking formation provided on one of the rotor-engaging portion and the rotatable shaft; and
a female interlocking formation provided on the other one of the rotor-engaging portion and the rotatable shaft.

9. The material processing apparatus of claim 7, wherein the rotor-engaging portion and the rotatable shaft are each provided with a respective corresponding key formation, the corresponding key formations being configured to allow the rotor-engaging portion to interlock with the rotatable shaft in only one relative rotational orientation of the rotor-engaging portion and the rotatable shaft.

10. The material processing apparatus of claim 7, wherein the rotor-engaging portion is configured to interlock with the rotatable shaft in a plurality of relative rotational orientations of the rotor-engaging portion and the rotatable shaft, and wherein the rotor-engaging portion and the rotatable shaft are each provided with a plurality of corresponding spline formations, the spline formations being circumferentially spaced-apart around a respective portion of the rotor-engaging portion and the rotatable shaft.

11. The material processing apparatus of claim 7, wherein the rotatable shaft includes, for engaging with the rotor-engaging portion, one of a projecting portion and a socket portion.

12. The material processing apparatus of claim 6, wherein the rotor-engaging portion comprises at least one of: a locking device; a locking pin; a projection; and a socket.

13. The material processing apparatus of claim 6, wherein the rotor-engaging portion is separately formed from the drive-engaging portion, and is configured for releasable interconnection with the drive-engaging portion, and wherein the drive-engaging portion is shaped to define an aperture through which the rotor-engaging portion extends when interconnected with the drive-engaging portion.

14. The material processing apparatus of claim 6, wherein the drive-engaging portion is connectable to the drive mechanism in one of:
a first orientation in which the rotor-engaging portion extends towards the rotor; and
a second orientation in which the rotor-engaging portion extends away from the rotor.

15. The material processing apparatus of claim 6, wherein the rotor comprises a rotatable shaft that is rotatable about a first axis, wherein the coupling means is configured to selectively couple the drive mechanism to the rotatable shaft, and wherein the drive-engaging portion and the rotor-engaging portion are configured such that, when the drive-engaging portion is connected to the drive mechanism, the rotor-engaging portion extends along an axis that is co-axial with the first axis of the rotatable shaft.

16. The material processing apparatus of claim 15, wherein the drive mechanism has a body that is shaped to define an aperture, and wherein when the drive-engaging portion is connected to the drive mechanism, the rotatable shaft extends into the aperture of the body.

17. The material processing apparatus of claim 6, wherein the drive mechanism has a body that is shaped to define an aperture, and wherein when the drive-engaging portion is connected to the drive mechanism, the rotor-engaging portion extends into the aperture of the body.

18. The material processing apparatus of claim 1, wherein the drive mechanism comprises a driving device for driving the drive mechanism, wherein the driving device comprises one of a powered driving device and a manually operated driving device.

19. The material processing apparatus of claim 1, wherein the rotor comprises a rotatable shaft that is rotatable about a first axis, wherein the coupling means is configured to selectively couple the drive mechanism to the rotatable shaft, and further including a bearing hub for connecting the drive mechanism to the crusher, wherein the bearing hub is coupled to the drive mechanism and rotatably supports the rotatable shaft.

20. The material processing apparatus of claim 1, wherein a rotatable shaft connected to the rotor is supported by a bearing mount, the rotor rotation device is coupled to the bearing mount and to the rotatable shaft, the drive mechanism comprises a body that supports the worm shaft and the worm wheel, the body is coupled to the bearing mount, and the worm wheel is coupled to the rotatable shaft.

\* \* \* \* \*